Patented Feb. 9, 1932

1,844,365

UNITED STATES PATENT OFFICE

WILLIAM HENRY MOSS, OF CUMBERLAND, MARYLAND, ASSIGNOR TO CELANESE CORPORATION OF AMERICA, A CORPORATION OF DELAWARE

SOLVENTS FOR DERIVATIVES OF CELLULOSE AND COMPOSITIONS PRODUCED THEREBY

No Drawing.    Application filed July 10, 1928. Serial No. 291,704.

This invention relates to the production of solvents for cellulose derivatives from mixtures of liquids of which the individual components are not themselves solvents for said cellulose derivatives, and relates more particularly to the use of solvent mixtures containing methylene chloride as one component thereof.

An object of my invention is to produce a solvent for cellulose derivatives containing methylene chloride and alcohols, which alcohols have a boiling point that is higher than that of methyl alcohol or ethyl alcohol.

A further object of my invention is to produce a coating composition or plastic composition containing derivatives of cellulose and a solvent mixture comprising methylene chloride and relatively non-volatile alcohol. Further objects of my invention will appear from the following detailed description.

It is known that methylene chloride and certain low boiling point alcohols, such as methyl alcohol or ethyl alcohol, form solvents for cellulose acetates. It is well known that both methyl and ethyl alcohols have a latent solubility for cellulose acetate, i. e. they form solvents for cellulose acetates when mixed with other liquids, either hot or cold. Thus for example, hot benzene and ethyl alcohol form a solvent for most types of cellulose acetate. However, it has not previously been noted that other alcohols having higher boiling points, have latent solubilities for cellulose acetate. In fact, these alcohols are generally regarded as strong precipitants for cellulose acetate. Thus the proportion of n-butyl alcohol, which can be added to an acetone solution of cellulose without precipitation, is in general much less than the proportion of ethyl alcohol and the proportion of amyl alcohol is still less. I have discovered, however, that the various relatively non-volatile alcohols when mixed with methylene chloride form an excellent solvent for cellulose acetate.

In accordance with my invention I prepare a solvent for derivatives of cellulose, which solvent contains methylene chloride ($CH_2Cl_2$) and a relatively non-volatile alcohol or a derivative thereof, and preferably one that boils above 100° C. This invention may be used for all purposes, such as making liquid coating composition or plastic compositions containing derivatives of cellulose, or for removing films of such derivatives from surfaces coated therewith.

The alcohol used in making the solvent mixture may be a monohydric alcohol of the aliphatic series having more than two carbon atoms. Examples of such alcohols are propyl alcohol or iso propyl alcohol, n-butyl, secondary butyl, iso butyl or tertiary butyl alcohol or any of the six theoretical amyl alcohols.

Examples of polyhydric alcohols or their ethers that may be used in preparing the solvent mixture are ethylene glycol, the monoethyl- or the mono methyl ether of ethylene glycol or other ethers of this glycol. Diethylene glycol or its various ethers may also be used in the solvent mixture.

Of the cyclic alcohols that may be used, cyclo hexanol (hexahydrophenol), or methyl cyclo hexanol may be mentioned.

Because this invention is particularly useful in connection with the preparation of solutions or plastic compositions containing cellulose acetate, details will be given with respect to the use of the solvent mixtures in connection with cellulose acetate.

Judged by the usual standards of solubility of cellulose esters, n-butyl alcohol and methylene chloride form a better solvent than a commonly used solvent such as acetone. Thus, while an acetone soluble cellulose acetate gave a solution in acetone of which the clarity in certain arbitrary units was 8, a solution of the same concentration in methylene chloride and butyl alcohol mixture was much clearer, and in the same arbitrary units was measured as 33.

The excellence of a mixture of methylene chloride and tertiary butyl alcohol as judged by the usual standards is shown by the fact that, whereas the above mentioned cellulose acetate gave a solution in acetone with a clarity of 8 and a viscosity of 2.8 measured in certain units, the clarity of a solution of equal concentration in methylene chloride and tertiary butyl alcohol was 34 and the viscosity 2.4; that is, the mixed solvent methylene chloride and tertiary butyl alcohol gave a solution with lower viscosity and a higher clarity than a standard solvent such as acetone.

As an instance of the excellent solvent properties of a mixture of methylene chloride and ethylene glycol or its ethers, it is pointed out that a solution of cellulose acetate in methylene chloride and mono ethyl ether of ethylene glycol gave viscosities and clarities measured in certain arbitrary units of 4.1 and 31.5 respectively, while the same concentration of cellulose acetate in acetone gave corresponding values of 2.8 and 8.

The proportions of the mixtures of these nonsolvents which form solvents for cellulose acetate of both the chloroform soluble type and the acetone soluble type are from 90% by volume methylene chloride and 10% by volume of the above mentioned alcohols and derivatives, to 40% by volume of methylene chloride and 60% by volume of the alcohols or their derivatives. These limiting proportions vary with various specimens of cellulose acetate and also quite considerably with the temperature. Thus, while the upper limit of mono ethyl ether of ethylene glycol that is advisable in a mixture of this ether and methylene chloride at 25° C. on a certain cellulose acetate is 70 parts by volume; at 35° C., the proportion is 75 parts by volume.

It is also possible to make a mixture of methylene chloride with two or more of the aforementioned alcohols, derivatives and cyclohexanols, such mixtures being made according to various important considerations such as cost, odor, rate of evaporation, etc., and solubility for other constituents which it may be desirable to add to the solution of cellulose acetate. Thus, for example in the preparation of lacquers, resins and softeners may also be added to the cellulose acetate solutions in the above mentioned solvent mixture, and due consideration should be given to their solubility characteristics in the selection of the solvent mixture.

The above mentioned solutions of cellulose derivatives are useful in many technical applications of cellulose derivatives, such as the formation of lacquers, plastic masses and films and also in removing cellulose derivatives, films, lacquers or dopes from surfaces already coated with them. In the formation of cellulose derivatives lacquers, the above solutions may be used with or without the addition of other solvents and diluents for the cellulose derivatives. These other solvents may take the form of high boiling but volatile solvents such as ethyl lactate, diacetone alcohol, tetrachlorethane or of a nonvolatile solvent, such as triacetin, diethyl phthlate, dibutyl tartrate, etc., which remains in the cellulose acetate film, and is commonly called a softener or plastifier.

Natural or synthetic resins, such as are compatible with the cellulose acetate or other derivatives of cellulose may also be added to the solutions and may also be considered as high boiling point solvents which remain in the film.

In some technical applications, the amount of high boiling point solvents of this type which is added to the cellulose acetate is such that the addition of other volatile high boiling point solvents such as ethyl lactate, etc., is unnecessary for the production of a clear film from the lacquer.

Diluents such as benzene, toluene, xylene, etc., may be added to the solutions or plastic compositions if desired. Dyes, pigment, or other effect material may be added as desired.

In the preparation of plastic masses, the above mentioned solvents may be used to soften or dissolve the derivative of cellulose to permit the incorporation of dyes, softeners or pigments.

In order further to illustrate my invention the following detailed examples are given by way of illustration, but it is understood, that my invention is not limited thereto.

*Example I*

The following is an example of a solution of an organic ester of cellulose containing methylene chloride and a monohydric aliphatic acid.

| | Parts |
|---|---|
| Cellulose acetate | 10 |
| Methylene chloride | 70 |
| Butyl alcohol | 30 |

*Example II*

This is an exmaple of use of ether of a glycol in the solvent mixture.

| | Parts |
|---|---|
| Cellulose acetate | 20 |
| Methylene chloride | 60 |
| Mono ethyl ether of ethylene glycol | 40 |

*Example III*

The following is an example of a composition that contains a plastifier:

| | Parts |
|---|---|
| Cellulose acetate | 10 |
| Methylene chloride | 70 |
| Tertiary butyl alcohol | 30 |
| Diethyl phthalate | 2 |

*Example IV*

The following is an example of a liquid coating composition containing a pigment:

| | Parts |
|---|---|
| Cellulose acetate | 10 |
| Methylene chloride | 90 |
| Monoethyl ether of ethylene alcohol | 10 |
| Ethyl lactate | 10 |
| Triacetin | 2.5 |
| Pigment | 3 |

Example V

The following is an example of the use of a cyclic alcohol:

| | Parts |
|---|---|
| Cellulose acetate | 20 |
| Methylene chloride | 80 |
| Cyclohexanol | 20 |
| Benzyl alcohol | 10 |

If desired cyclic hexanol may be replaced by amyl alcohol.

It is to be understood that the foregoing is given merely by way of illustration and that many variations may be made therein without departing from the spirit of my invention.

Having described my invention, what I claim and desire to secure by Letters Patent is:

1. A solvent for esters, of cellulose comprising methylene chloride and a relatively nonvolatile liquid selected from the group of aliphatic alcohols and their ethers.

2. A solvent for esters of cellulose comprising methylene chloride and a relatively nonvolatile liquid selected from the group of aliphatic alcohols and their ethers having a boiling point above 100° C.

3. A solvent for esters of cellulose comprising methylene chloride and a relatively nonvolatile aliphatic alcohol.

4. A solvent for esters of cellulose comprising methylene chloride and an aliphatic alcohol having more than two carbon atoms.

5. A solvent for esters of cellulose comprising methylene chloride and a relatively nonvolatile liquid selected from the group of polyhydric alcohols and their aliphatic ethers.

6. A solvent for cellulose acetate comprising methylene chloride and butyl alcohol.

7. A solvent for cellulose acetate comprising methylene chloride and ethylene glycol.

8. A solvent for cellulose acetate comprising methylene chloride and mono ethyl ether of ethylene glycol.

9. A composition of matter containing esters of cellulose at least partially dissolved in a solvent mixture comprising methylene chloride and a relatively nonvolatile liquid selected from the group of aliphatic alcohols and their ethers.

10. A composition of matter containing cellulose acetate at least partially dissolved in a solvent mixture comprising methylene chloride and a relatively nonvolatile liquid selected from the group of aliphatic alcohols and their ethers.

11. A composition of matter containing cellulose acetate at least partially dissolved in a solvent mixture comprising methylene chloride and mono ethyl ether of ethylene glycol.

12. A composition of matter containing cellulose acetate at least partially dissolved in a solvent mixture comprising methylene chloride and an aliphatic alcohol having a boiling point above 100° C.

13. A composition of matter containing cellulose acetate at least partially dissolved in a solvent mixture comprising methylene chloride and a butyl alcohol.

14. A composition of matter containing cellulose acetate at least partially dissolved in a solvent mixture comprising methylene chloride and an aliphatic alcohol having more than two carbon atoms.

15. A composition of matter containing a derivative of cellulose at least partially dissolved in a solvent mixture comprising methylene chloride and a substance selected from the group of polyhydric alcohols and their aliphatic ethers.

16. A composition of matter containing an organic ester of cellulose at least partially dissolved in a solvent mixture comprising methylene chloride and a substance selected from the group of polyhydric alcohols and their aliphatic ethers.

17. A composition of matter containing cellulose acetate at least partially dissolved in a solvent mixture comprising methylene chloride and a substance selected from the group of polyhydric alcohols and their aliphatic ethers.

18. A composition of matter containing cellulose acetate at least partially dissolved in a solvent mixture comprising methylene chloride and ethylene glycol.

In testimony whereof, I have hereunto subscribed my name.

WILLIAM HENRY MOSS.